(12) United States Patent
Nakamoto et al.

(10) Patent No.: US 6,317,249 B1
(45) Date of Patent: Nov. 13, 2001

(54) OPTICAL MODULATOR OUTPUTTING AN OPTICAL SIGNAL WITH A DRIVE VOLTAGE SIGNAL DEPENDENT UPON AN INPUT SIGNAL

(75) Inventors: Hiroshi Nakamoto; Takao Naito, both of Kawasaki; Kazunori Hayami, Dazaifu; Shinji Sonoda, Fukuoka, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/455,021

(22) Filed: Dec. 6, 1999

(30) Foreign Application Priority Data

Dec. 8, 1998 (JP) .................................................. 10-349034

(51) Int. Cl.[7] .............................. G02F 1/01; H04B 10/04
(52) U.S. Cl. ......................... 359/279; 359/182; 359/183; 359/187
(58) Field of Search .................................. 359/279, 184, 359/185, 187, 182, 183; 385/2, 3, 1; 356/477; 372/26, 29.015, 29.02, 38.07, 38.1; 250/201.1

(56) References Cited

U.S. PATENT DOCUMENTS

| 5,170,274 | * | 12/1992 | Kuwata et al. ....................... 359/182 |
| 5,317,443 | * | 5/1994 | Nishimoto .............................. 359/187 |
| 5,629,792 | * | 5/1997 | Masaki ................................... 359/245 |
| 5,646,771 | * | 7/1997 | Noda ...................................... 359/245 |
| 5,742,268 | * | 4/1998 | Noda ........................................ 345/84 |

FOREIGN PATENT DOCUMENTS

0444688A2 * 4/1991 (EP) .............................. H04B/10/14

* cited by examiner

Primary Examiner—Georgia Epps
Assistant Examiner—Gary O'Neill
(74) Attorney, Agent, or Firm—Staas & Halsey LLP

(57) ABSTRACT

The present invention relates to an optical transmitter and particularly to an optical transmitter including an external optical modulator such as Mach-Zehnder type optical modulator which modulates the light from a light source to output an optical signal with a drive voltage signal generated depending on an input signal According to the present invention is achieved by providing an optical modulator, which add weighting to operating point control signal in accordance with optical output level of the modulator.

11 Claims, 7 Drawing Sheets

OPTICAL MODULATOR OUTPUTTING AN OPTICAL SIGNAL WITH A DRIVE VOLTAGE SIGNAL DEPENDENT UPON AN INPUT SIGNAL

BACKGROUND OF THE INVENTION

1. Field of the Invention

The present invention relates to an optical transmitter and particularly to an optical transmitter including an external optical modulator such as Mach-Zehnder type optical modulator which modulates the light from a light source to output an optical signal with a drive voltage signal generated depending on an input signal.

2. Description of the Related Art

The LiNbO3 Mach-Zehnder type modulator used as an optical-electrical conversion element in an optical transmitter has excellent optical-electrical conversion characteristic and dynamic wavelength variation characteristic but generates change (drift of operating point) of the input/output characteristic depending on the impressed DC voltage, temperature change and aging.

Control of operating point drift is described in the Japanese publication No. Hei 02-50189.

Structure of the Japanese publication No. Hei 02-50189 is illustrated in FIG. 6.

In the method of FIG. 6, a low frequency signal is superimposed to a drive signal, the frequency element of low frequency signal included in an optical signal output from an external modulator is detected, variation of operating point is detected by comparing phase of low frequency signal output from a low frequency oscillator and the frequency element of low frequency signal detected from an optical output is controlled to be eliminated.

FIG. 7 illustrates the principle diagram of operation of the Japanese publication No. Hei 02-50189.

A drive circuit 2 amplifies an input electrical signal to the predetermined voltage amplitude.

A low frequency superimposing circuit 3 receives a low frequency signal (frequency f0) from a low frequency oscillator 8, eliminates, after superimposing of only several percents to the drive signal, this element through capacitance coupling and symmetrically superimposes low frequency modulation to the upper and lower portions of envelope of the drive signal.

The light beam emitted from a light source 1 is intensity-modulated by an optical modulator 4.

Operating point of the optical modulator is determined by a bias control circuit 9.

A part of the modulator output is branched by an optical branch 5, converted to an electrical signal by a light receiving element 6, detected in its only low frequency element superimposed by a band-pass filter 71 and is then input to a synchronous detecting circuit 73.

A low frequency signal from the low frequency oscillator 8 is input to another input of the synchronous detecting circuit 73 for phase comparison with the detected low frequency element.

Amplitude of the detected low frequency element is minimized ((a) of FIG. 7) when the drive signal is located on the curve between the desired valley and mountain of the opto-electric conversion characteristic of optical modulator 4.

Polarity of detected low frequency element is different depending on the optical-electrical conversion characteristic which shifts to a higher voltage side (c of FIG. 7) from the optimum point (a) or to a lower voltage side (b of FIG. 7) by the drift.

Therefore, the signal of different polarity can be obtained depending on the shifting direction of an output compared in phase in the synchronous detecting circuit 73.

The bias can be set to the optimum point (a) of FIG. 7 by integrating such signal with a low-pass filter (LPF) 74 and then feeding back it to add the bias voltage to the modulator using the bias control circuit 9.

In this method, the operating point of the optical-electrical conversion characteristic is fixed to the center.

However, on the occasion of transmitting the signal to the transmission line in which the erbium-doped fiber optical amplifier is connected in many stages, more excellent sensitivity characteristic can be obtained by shifting the operating point from the center and it is desirable that the operating point can be set to the desired position.

Regarding this point, the Japanese publication No. Hei 08-548366 discloses the structure that operating point can be set to the desired area by adding an operating point shift circuit.

The Japanese publication No. Hei 08-548366 executes phase comparison by adjusting polarity and amplitude of a part of the output of low frequency oscillator, while the frequency element of low frequency signal included in the optical signal output from external modulator is detected and phase of low frequency signal output from the low frequency oscillator is compared in the Japanese publication No. Hei 02-50189.

As the operation, control is performed so that the frequency element of low frequency signal detected from an optical output and low frequency signal to be added are removed.

Therefore the operating point can be fixed to the point including the offset at the center of the optical-electrical conversion characteristic.

However, since power element of low frequency signal detected from optical output depends on the modulator optical output, when output optical power of modulator varies, for example, the low frequency signal added to generate offset does not change even when output amplitude of frequency element of low frequency signal detected changes and as a result the offset amount of modulator may probably be changed.

An output power of modulator will change when optical output of light source changes or when operation loss of modulator changes by aging characteristic and change of environmental temperature and since such change may be generated in the practical operation, a certain kind of measure has been requested.

SUMMARY OF THE INVENTION

Accordingly, it is an Object of the present invention to provide an optical modulator which is automatic bias control of external modulator which does not change of operating point due to the change of output optical power of modulator, while freely setting the operating point of external modulator.

Object of the present invention is achieved by providing an optical modulator, which add weighting to operating point control signal in accordance with optical output level of the modulator.

DESCRIPTION OF THE PREFERRED EMBODIMENTS

Figure 1:
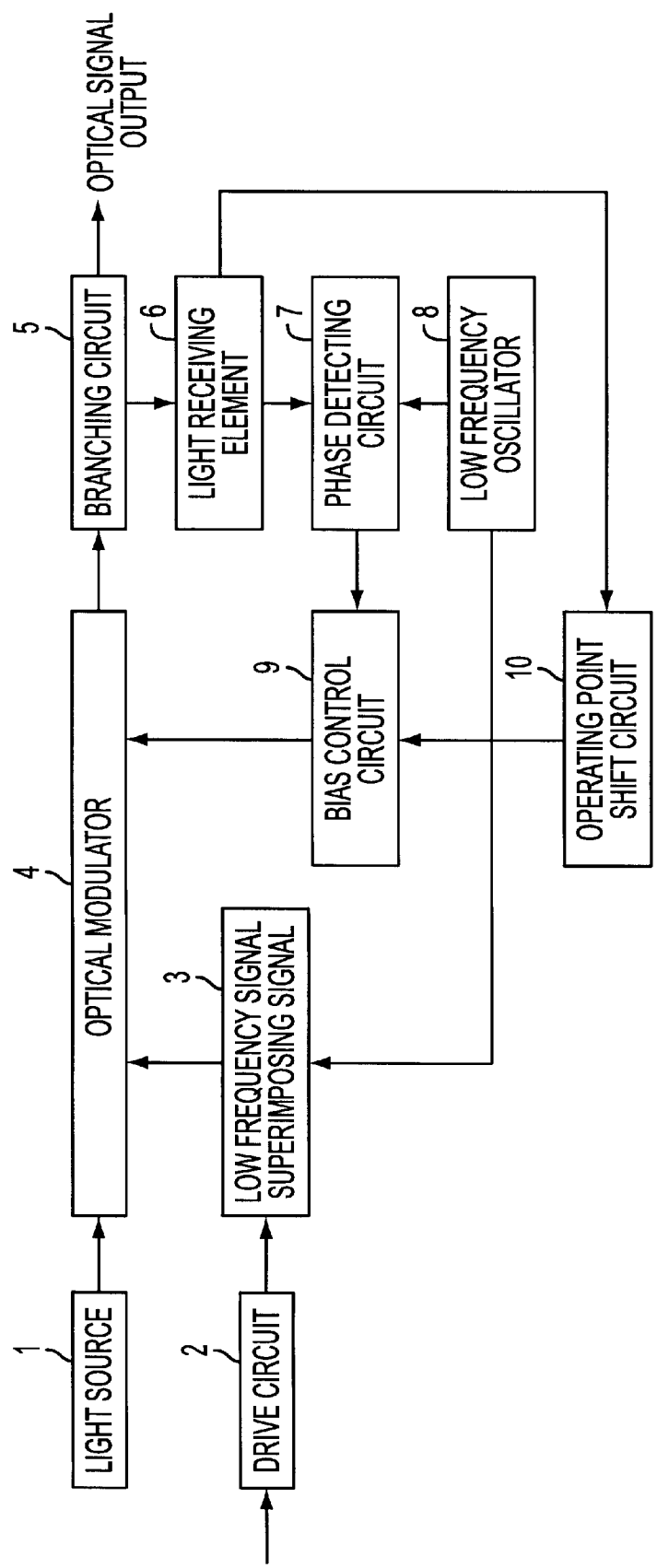
FIG. 1 is a schematic structural diagram of the present invention.

FIG. 1 illustrates a schematic structural diagram of the present invention.

An input signal is amplified up to the desired voltage amplitude by the drive circuit 2.

A part of the low frequency signal from the low frequency oscillating circuit 8 is input to a low frequency signal superimposing circuit 3 for the amplitude modulation in which the low frequency modulation is symmetrically superimposed to the upper and lower portions of envelope of the drive signal from the drive circuit.

The light beam of a light source 1 consisting of laser diode is intensity-modulated by the $LiNbo_3$ Mach-Zehnder type optical modulator 4 and a part of output light beam is partly branched by a branching circuit 5 and is then incident to the light receiving element 6.

A part of the electrical signal output of the light receiving element 6 is multiplied one output of the low frequency generator 8 in the phase detecting circuit 7 for phase comparison.

An output of the phase detecting circuit 7 is inputted to the bias control circuit 9 for the bias control of optical modulator 4.

The operating point shift circuit 10 receives an electrical signal of the light receiving element 6 and gives the signal for operating point offset of bias control circuit 9 for optical output level variation of optical modulator.

The bias control circuit 9 controls a bias voltage value to be added to the optical modulator 4 based on the phase information from the phase detecting circuit 7 and an output of the operating point shift circuit 9.

So, the branching circuit 5 may be replaced with optical branching provided in the optical modulator 4 and it is also possible to detect leakage beam and radiated beam other than the guided wave at the chip end surface in the output side with the light receiving element 6 without use of the branching circuit.

Figure 2:
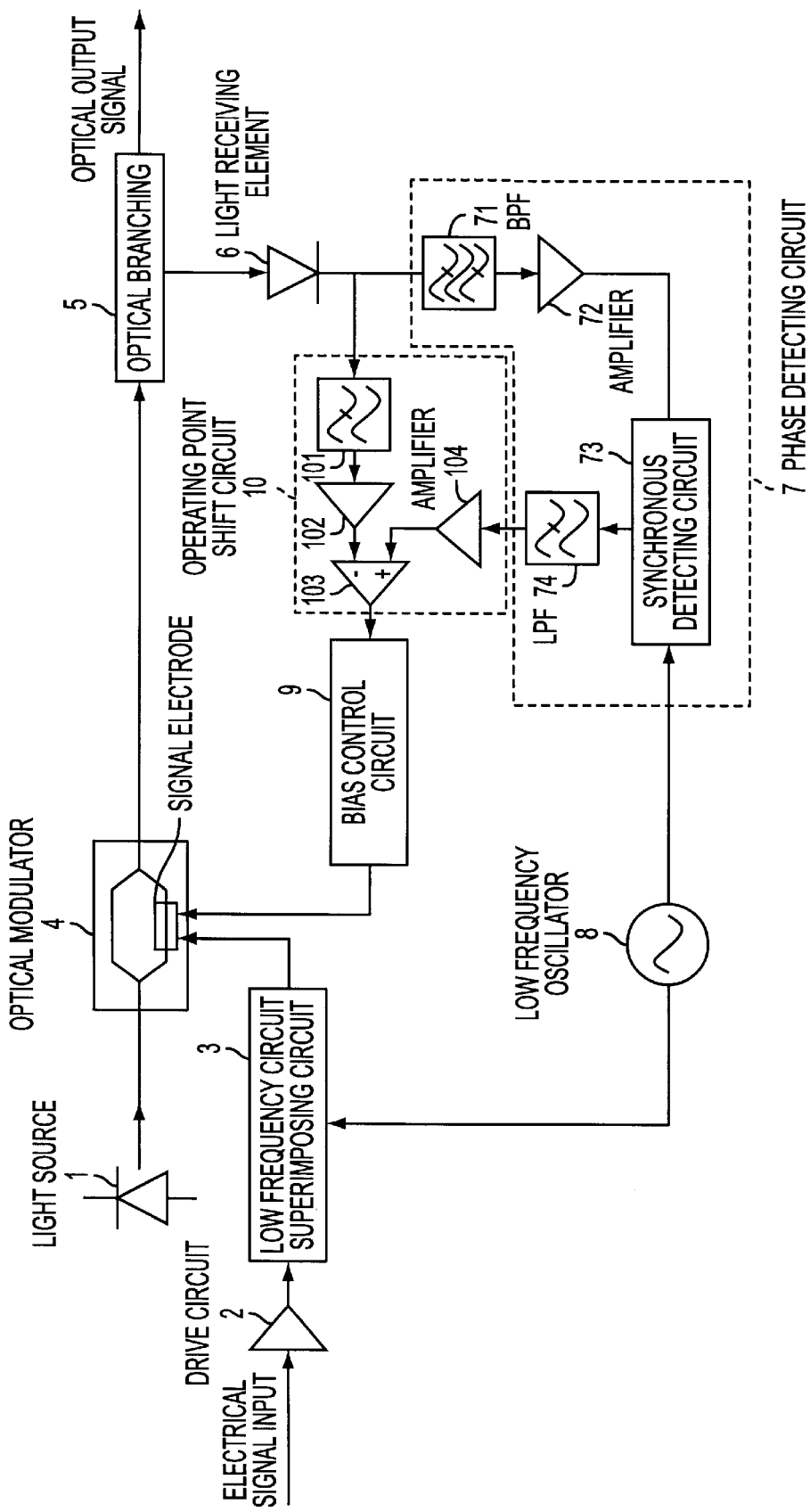
FIG. 2 illustrates a structure 1 of an embodiment.

FIG. 2 illustrates a structure of the embodiment 1 of FIG. 1.

The elements like those in FIG. 1 are designated by the like reference numerals in FIG. 2.

The phase detecting circuit 7 extracts the low frequency element with a band-pass filter (BPF) 71 from an electrical signal output of the light receiving element 6 and executes, after amplification by an amplifier 72, the synchronous detection by the synchronous detecting circuit 73 through multiplication with low frequency output of the low frequency oscillating circuit 8. An output of this phase detecting circuit 7 is integrated through the low-pass filter 74.

The operating point shift circuit 10 inputs, after amplification by an amplifier 104, an output of the phase detecting circuit 7 to a subtracting circuit 103.

Moreover, the operating point shift circuit 10 integrates, for offset adjustment, an electrical signal output of the light receiving element 6 through the low-pass filter 101 and thereafter applies the signal, after amplification up to an adequate level by an amplifier 102, to the subtracting circuit 103.

Figure 4:
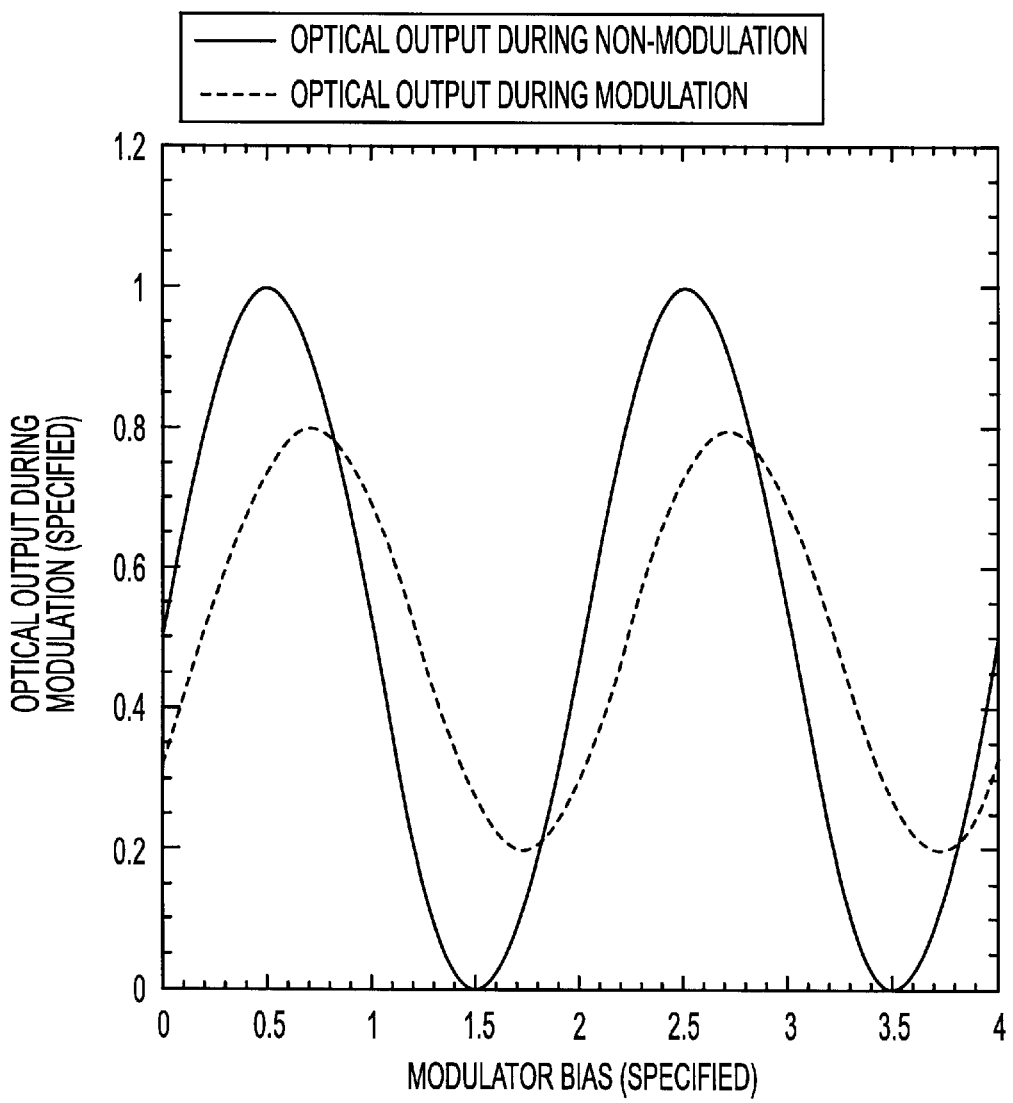
FIG. 4 is a diagram illustrating dependence on bias of an optical modulator output.

FIG. 4 illustrates dependence on bias of optical output of optical modulator.

A solid line in the figure indicates characteristic during non-modulation mode, while a broken line indicates an output of the optical modulator during the return-to-zero (RZ) modulation mode.

In the figure, the vertical axis specifies an optical output of the optical modulator and "1" indicates the maximum optical output (input beam to the modulator is completely output).

The horizontal axis indicates a bias voltage applied to the optical modulator and "1" indicates $V\pi$.

During the RZ modulation mode, height and position of the mountain and valley of optical output power are different from those in the non-modulation model.

Difference in height of mountain and valley is generated these are distributed in the amplitude direction of the optical waveform in the RZ modulation mode and therefore complete emission or complete extinguishing is never generated even when the bias is changed.

Difference in position of mountain and valley is generated because power density is higher in the lower half of the amplitude direction of optical waveform during the RZ modulation mode.

Figure 5:
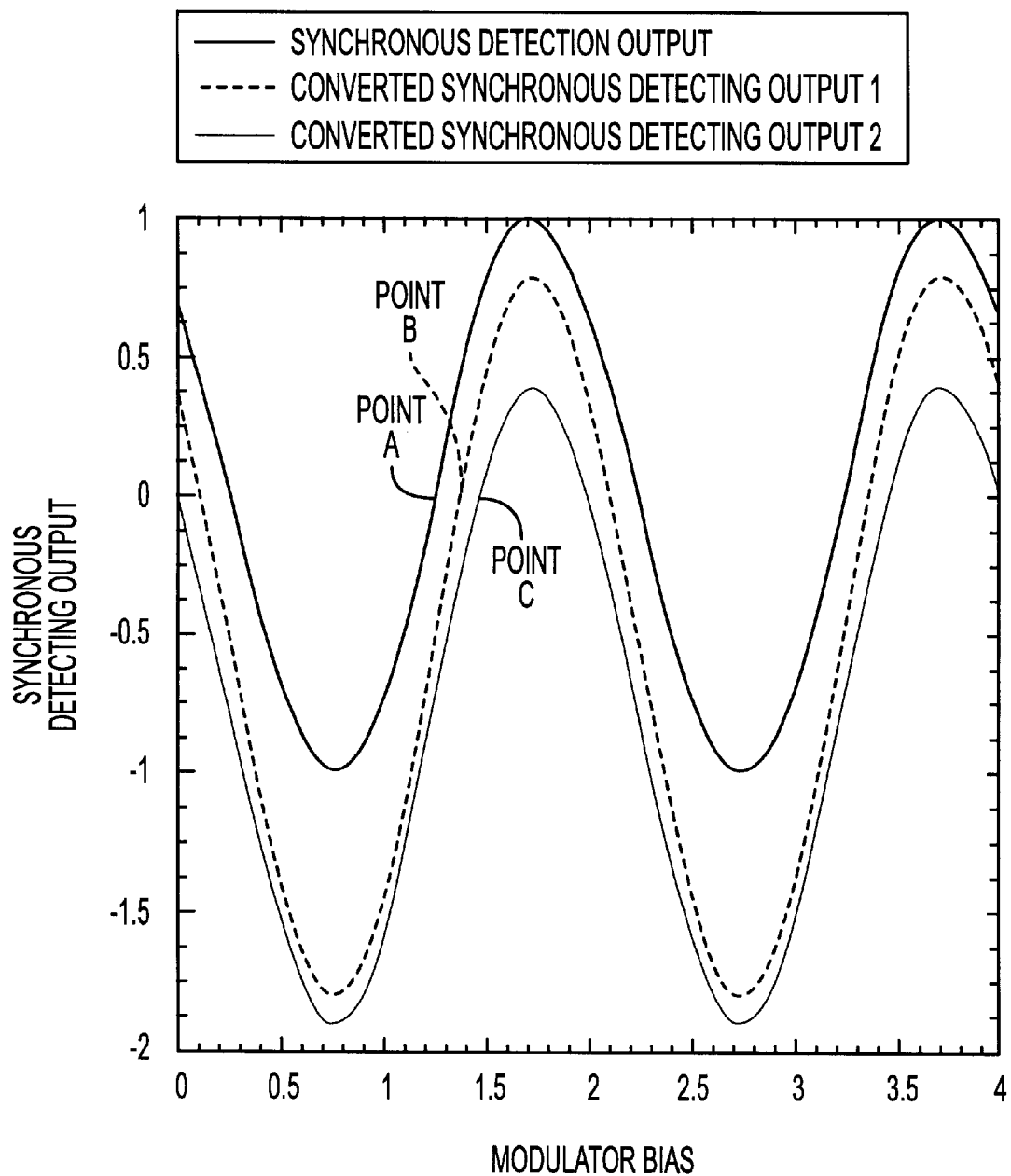
FIG. 5 is a diagram illustrating dependence on bias of synchronous detecting output.
Figure 6:
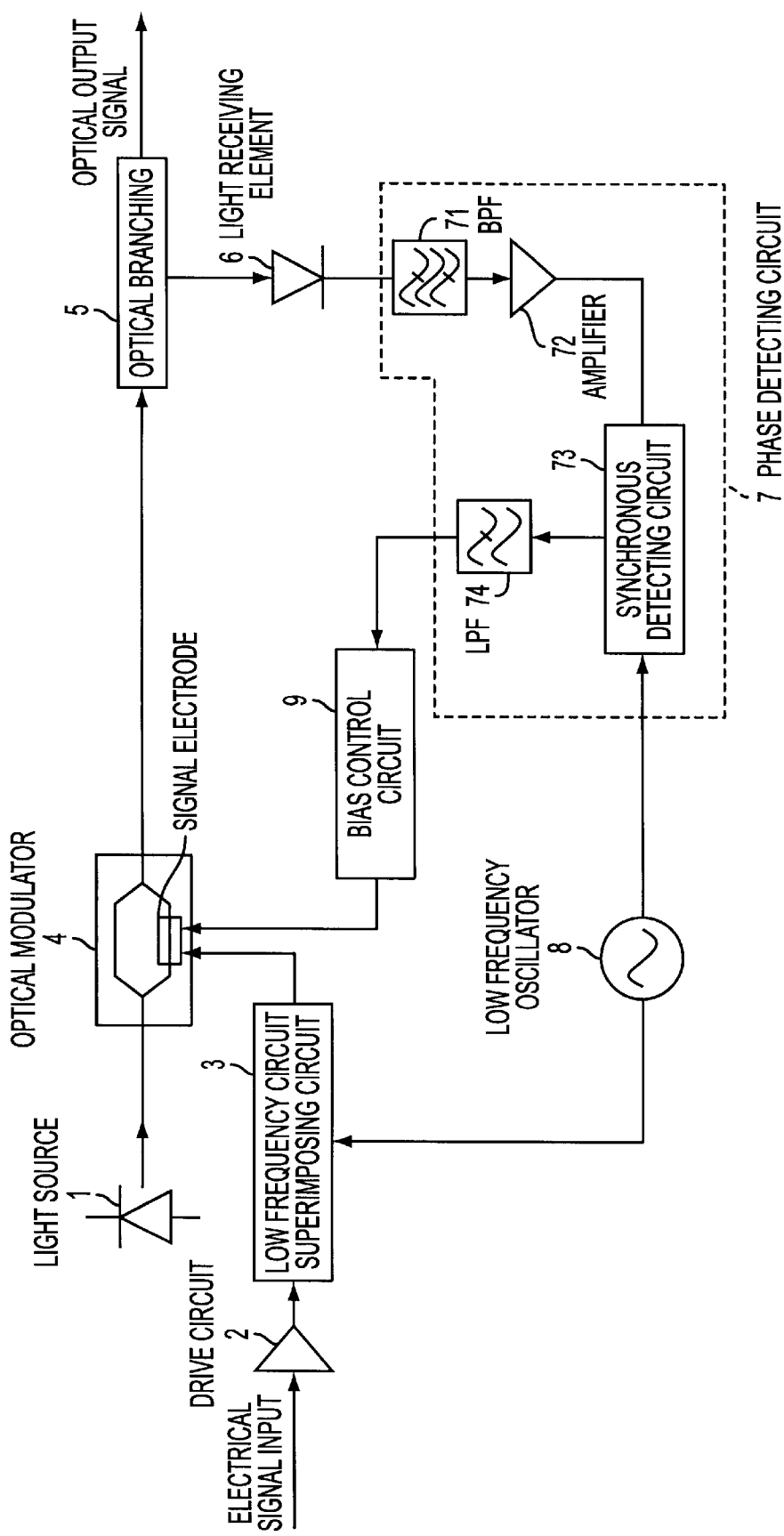
FIG. 6 is a structural diagram of a reference.
Figure 7:
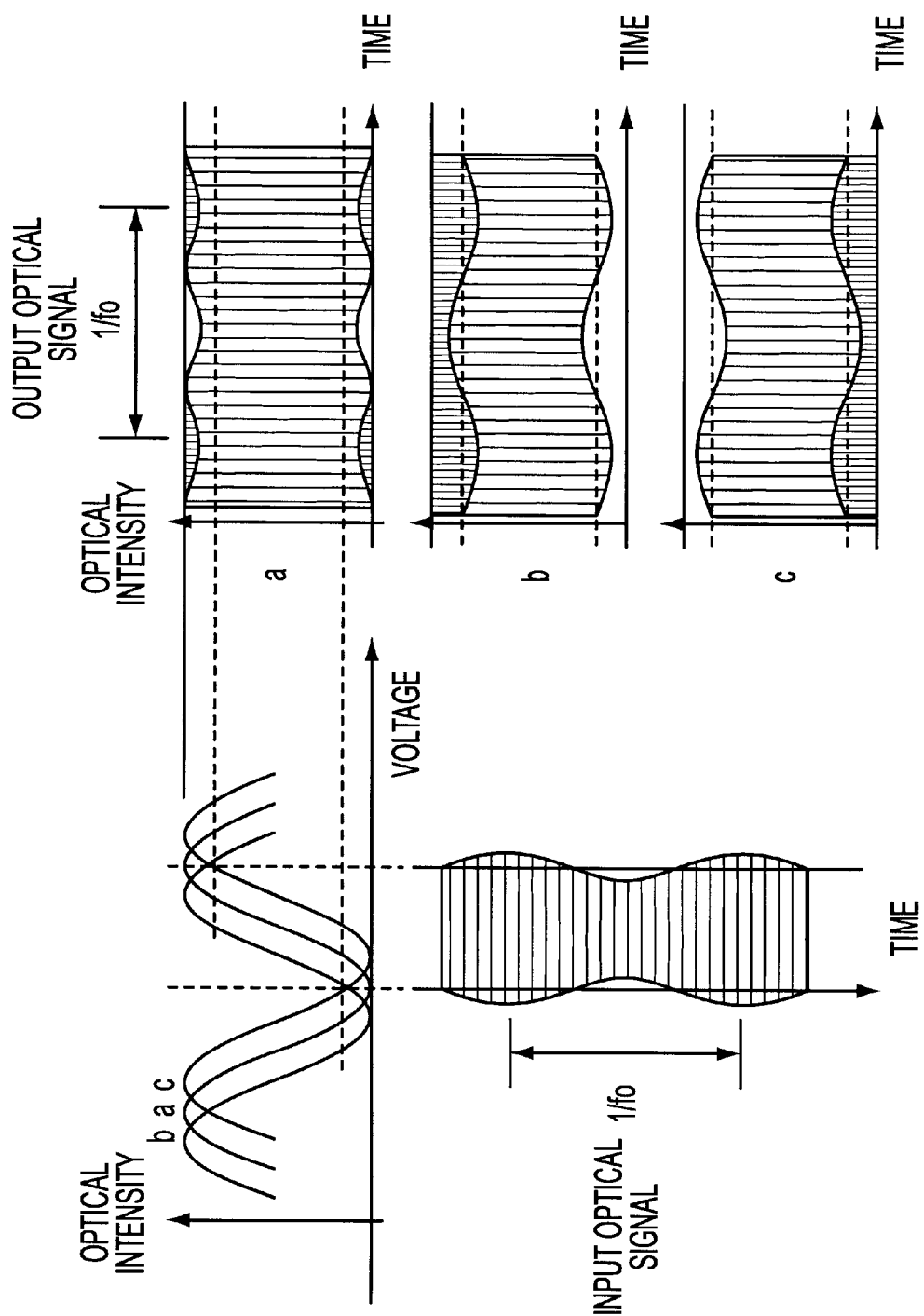
FIG. 7 is a diagram for explaining operation principle of a reference.

FIG. 5 illustrates dependence on modulator bias of the converted synchronous detecting output obtained through adequate amplification and comparison to obtain a difference between the synchronous detecting circuit output and modulator output power received by the light receiving element.

Two converted synchronous detecting outputs are identical to the synchronous detecting circuit output and modulator output power received by the light receiving element in which amplification factors are changed.

The synchronous detecting circuit output has the zero point at the point A, while the converted synchronous detecting output has the zero point at the point B or C.

The zero point may be changed by changing the amplification factor.

In the operation of the Japanese publication No. Hei 02-50189, since the modulator bias is fed back by integrating the synchronous detecting output, the modulator bias is controlled to fix the operating point of the modulator to the point A.

Therefore, the operating point of the modulator can be fixed to the point B by feeding back the modulator bias by integrating the converted synchronous detecting output of FIG. 5.

Moreover, the operating point can be changed by respectively changing the amplification factors of the synchronous detecting circuit output and modulator output power received by the light receiving element.

FIG. 2 illustrates the converted synchronous detecting output control with a operating point shift circuit which shifts the operating point with the amplitude of low frequency element from the light receiving element under the condition that the operating point of the predetermined value is shifted to the synchronous detecting output of the phase detecting circuit 7.

Thereby, the operating point can accurately be set even when the amplitude of low frequency element changes due to influence of light source 1 and optical modulator 4.

Moreover, the zero point of the converted synchronous detecting output can be shifted to the zero point by changing respective amplification factors when the synchronous detecting output and modulator output power received by the light receiving element are amplified by the amplifiers 72, 104, 102 at the time of calculating the converted synchronous detecting output.

Namely, the offset amount can be set freely.

Moreover, an output of the synchronous detecting circuit is proportional to optical output power of modulator but since detected optical power of light receiving element for subtraction is also proportional to optical output power of modulator, it is controlled that the operating point of the modulator is shifted by optical output power of modulator.

Figure 3:
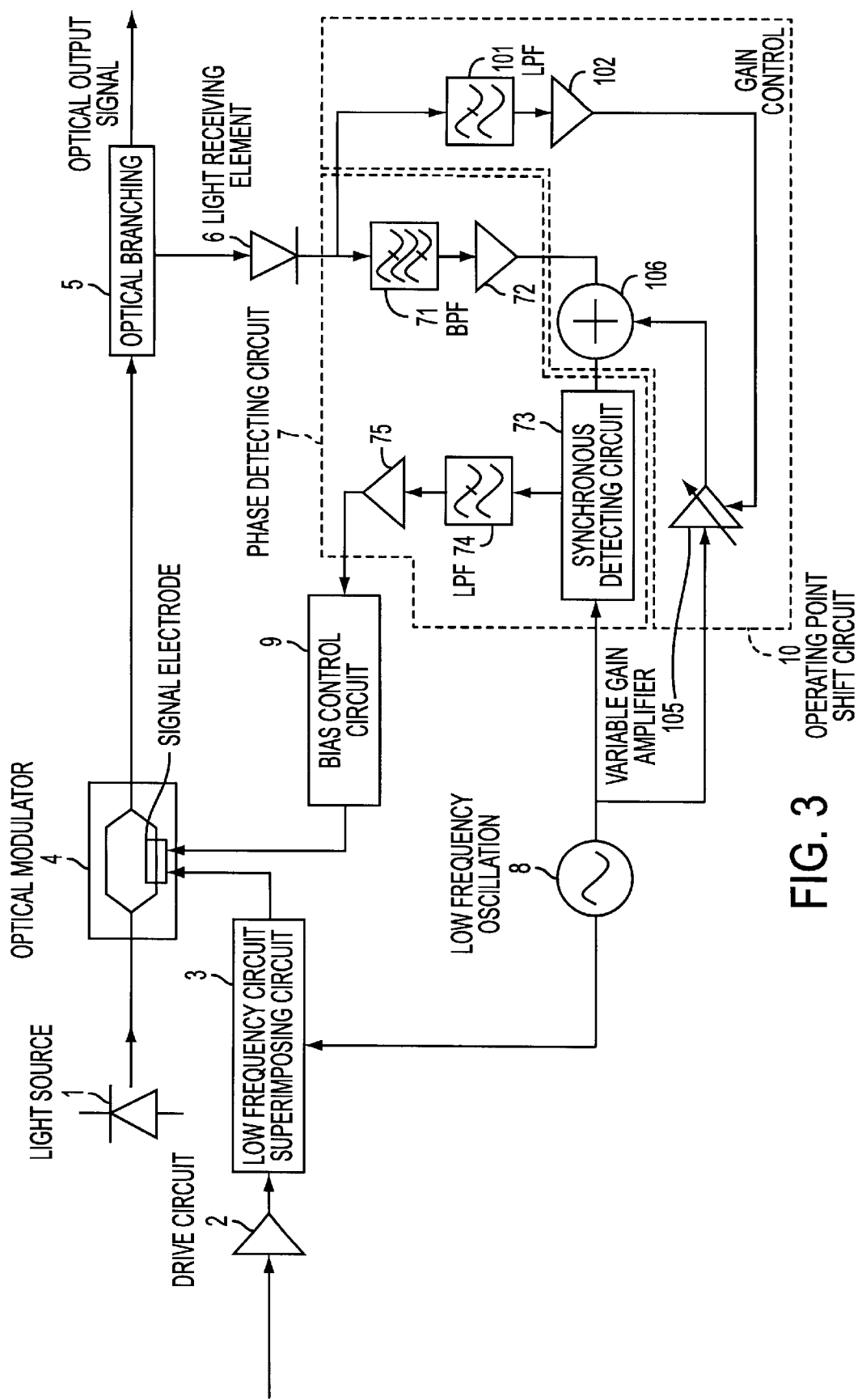
FIG. 3 illustrates a structure 2 of an embodiment.

FIG. 3 illustrates a structure of the embodiment 2 of FIG. 1.

The elements like those in FIG. 1 are designated by the like reference numerals in FIG. 3.

The operating point shift circuit 10 amplifies an electrical signal of the light receiving element 5 by the amplifier 102 through the low-pass filter 101 and then changes the gain of a part of the output of low frequency oscillator 8 depending on the output of amplifier 102.

After amplification in the variable gain amplifier 105, an adding circuit 106b adds, to the low frequency element amplified by the amplifier 72, an output obtained by detecting low frequency from an output of the light receiving element with BPF 71 in the phase detecting circuit 7 and then inputs the signal to the synchronous detecting circuit 73.

Since the bias control is performed so that the low frequency signal from an output of the variable gain amplifier 105 and the detected low frequency element become zero, offset can be added to the operating point of modulator.

The operating point of the optical modulator 4 can be set to the desired position by adjusting amplitude or polarity of the low frequency signal to be added by the adding circuit 106.

Moreover, since the modulator output power received by the light receiving element 6 is used, the detected low frequency element changes in proportion to variation of output power of the optical modulator and the low frequency signal given to add offset of the operating point also changes proportion to change of output power of optical modulator. Thereby, dependence on optical power of the operating point can be controlled.

The input signal of this control system is explained in the RZ system but it can also be explained in the NRZ system.

Moreover, in order to avoid temperature characteristic of the circuit, a temperature sensor, for example, is installed at the area near the low frequency superimposing circuit and therefore the amplification factor of the amplifier, when the synchronous detecting circuit output is multiplied with an optical current of the light receiving element respectively in the adequate values, may be changed with change of temperature.

By structuring the first embodiment and second embodiment, the operating point of optical modulator can be set at the desired position while controlling the operating point compensation of the optical modulator 4 and simultaneously the control for suppressing change of operating point due to the change of optical power of light source or the change of loss of optical modulator can be realized.

What is claimed is:

1. An optical modulator, comprising:
   a light source;
   a drive circuit generating a drive signal depending on an input signal;
   a low frequency oscillator generating a low frequency signal;
   a low frequency superimposing circuit amplitude-modulating said drive signal with the low frequency signal of said low frequency oscillator;
   a modulator modulating a light beam emitted from said light source depending on an output of said low frequency signal superimposing circuit;
   a light receiving element monitoring an optical output power of said optical modulator;
   a phase detector detecting a low frequency characteristic included in a signal output from said light receiving element for comparison with said low frequency signal generated by said low frequency oscillator;
   an operating point shift circuit receiving an electrical signal of the light receiving element and outputting a signal for shifting an operating point of the modulator in accordance with an output power of said light receiving element; and
   a controller controlling the operating point of the optical modulator with an output of said phase detector and an output of said operating point shift circuit.

2. An optical modulator according to claim 1 wherein said operating point shift circuit adds an output of said low frequency generator to output of said light receiving element in accordance with the output of said light receiving element.

3. An optical modulator according to claim 1 wherein said operating point shift circuit weights an output of said phase detector in accordance with an output of said light receiving element.

4. An optical modulator according to claim 1 wherein said modulator comprises a Mach-Zehnder type optical modulator.

5. An optical modulators according to claim 1 wherein said phase detector comprises a synchronous detecting circuit.

6. An apparatus for controlling bias voltage of optical modulator, comprising:
   a bias detect circuit detecting a slip amount of bias voltage in accordance with a predetermined low frequency of input signal of the optical modulator and a predetermined low frequency of an output signal of the optical modulator;
   an operating point shift circuit detecting a light output power of the optical modulator and offsetting the bias voltage in accordance with the light output power of the optical modulator; and
   a bias control circuit controlling said bias voltage of the optical modulator in accordance with the operating point shift circuit.

7. An apparatus for controlling bias voltage of optical modulator, comprising:
   a bias detect circuit detecting a slip amount of bias voltage in accordance with a predetermined low frequency of input signal of the optical modulator and a predetermined low frequency of an output signal of the optical modulator;
   an operating point shift circuit detecting a light output power of the optical modulator and offsetting the output power from the optical modulator in accordance with the light output power of the optical modulator; and a bias control circuit controlling said bias voltage of the optical modulator in accordance with the bias detect circuit.

8. An apparatus for controlling bias voltage of optical modulator, comprising:

bias detect circuit means for detecting a slip amount of bias voltage in accordance with a predetermined low frequency of input signal of the optical modulator and a predetermined low frequency of an output signal of the optical modulator;

operating point shift circuit means for detecting a light output power of the optical modulator and offsetting the bias voltage in accordance with the light output power of the optical modulator; and bias control circuit means for controlling said bias voltage of the optical modulator in accordance with the operating point shift circuit means.

9. An apparatus for controlling bias voltage of optical modulator, comprising:

bias detect circuit means for detecting a slip amount of bias voltage in accordance with a predetermined low frequency of input signal of the optical modulator and a predetermined low frequency of an output signal of the optical modulator;

operating point shift circuit means for detecting a light output power of the optical modulator and offsetting the output power from the optical modulator in accordance with the light output power of the optical modulator; and bias control circuit means for controlling said bias voltage of the optical modulator in accordance with the bias detect circuit means.

10. A method comprising:

detecting a slip amount of bias voltage in accordance with a predetermined low frequency of an input signal of an optical modulator and a predetermined low frequency of an output signal of the optical modulator;

detecting a light output power of the optical modulator and offsetting the bias voltage in accordance with the light output power of the optical modulator; and controlling said bias voltage of the optical modulator in accordance with the detecting a light output power and the offsetting the bias voltage.

11. A method comprising:

detecting a slip amount of bias voltage in accordance with a predetermined low frequency of an input signal of an optical modulator and a predetermined low frequency of an output signal of the optical modulator;

detecting a light output power of the optical modulator and offsetting the output power from the optical modulator in accordance with the light output power of the optical modulator; and controlling said bias voltage of the optical modulator in accordance with the detecting a light output power and the offsetting the output power.

* * * * *